(12) United States Patent
Kiely

(10) Patent No.: US 7,022,914 B1
(45) Date of Patent: Apr. 4, 2006

(54) ELECTRICAL CONNECTORS

(75) Inventor: Kenneth M. Kiely, Milford, CT (US)

(73) Assignee: Bridgeport Fittings, Inc., Stratford, CT (US)

(*) Notice: Subject to any disclaimer, the term of this patent is extended or adjusted under 35 U.S.C. 154(b) by 0 days.

(21) Appl. No.: 11/084,917

(22) Filed: Mar. 21, 2005

(51) Int. Cl.
*H02G 3/18* (2006.01)

(52) U.S. Cl. .............................. 174/65 R; 174/65 SS; 174/151; 248/56; 16/2.2

(58) Field of Classification Search .............. 174/65 R, 174/59, 135, 65 SS, 19, 72 A, 64, 153 R, 174/152 G, 153 G, 151, 31 R, 91; 248/49, 248/62, 63, 74.4, 56; D8/396, 395, 394; 16/2.1, 2.2; 439/557, 567, 553, 552, 357, 439/358

See application file for complete search history.

(56) References Cited

U.S. PATENT DOCUMENTS

| 2,967,722 | A | * | 1/1961 | LifKa .......................... 285/424 |
| 4,775,122 | A | * | 10/1988 | McClymont .............. 174/65 R |
| 5,872,335 | A | * | 2/1999 | Mullen, Jr. ................ 174/65 R |
| D473,783 | S | * | 4/2003 | Kiely ........................... D8/396 |
| D479,984 | S | * | 9/2003 | Kiely ........................... D8/396 |
| 6,737,584 | B1 | * | 5/2004 | Kiely ........................ 174/65 R |
| 6,875,918 | B1 | * | 4/2005 | Sudo et al. ................. 174/135 |
| 6,881,901 | B1 | * | 4/2005 | Egan ........................ 174/65 R |

* cited by examiner

*Primary Examiner*—Angel R. Estrada
(74) *Attorney, Agent, or Firm*—Melvin I. Stoltz

(57) ABSTRACT

By providing an integrated base member and cover member, with the cover member being easily arcuately pivotable along one edge and easily fastened to the base member along the opposed edge, an easily manufactured and easily assembled conduit/cable connector is realized. Furthermore, by employing the conduit/cable connector of the present invention, any desired flexible metal conduit and/or armored or metal clad cable is quickly and easily secured to the connector for mounting thereof to an outlet box or junction box at right angles, with complete assurance that the entire mounting operation can be achieved by a single operator quickly and easily.

12 Claims, 3 Drawing Sheets

ELECTRICAL CONNECTORS

TECHNICAL FIELD

This invention relates to electrical connectors, and more particularly, to electrical connectors constructed for securing flexible metal conduits and/or metal clad sheath cables to junction boxes and/or outlet boxes.

In the field of wiring homes and buildings, whether for new construction or for improvements or expansion, substantial development and product improvements have been made. Typically, these improvements are directed to enabling installers to securely mount any desired wiring to any desired location in the most efficient and quickest manner.

In any particular installation or location, various conduits or cables must be interconnected to each other as well as connected to the primary power supply in a suitable power distributing outlet box, junction box or other enclosure. In each of these instances, flexible metal conduits and/or armored or metal clad cables, within which the electrical power carrying wires are contained, must be securely mounted to the housing of the junction box or outlet box, or connected to appropriate devices, in a protected area.

In order to enable installers to securely mount flexible metal conduits and/or armored or metal clad cables to any desired junction box or outlet box, numerous prior art connectors have been developed. However, in spite of the substantial effort that has been expended in developing such connectors, these prior art systems have drawbacks or difficulties which prevent their universal adoption and use.

In general, the industry has long sought to have a single conduit/cable connector which is quickly and easily secured to any desired junction box or outlet box which enables flexible metal conduits and/or metal clad or armored cables to be securely mounted to the connector with a bend which substantially comprises a right angle. Due to the location or position of the junction box and/or outlet box, flexible metal conduits and/or metal clad or armored cables frequently require right angle bends in order to obtain the optimum securement location for affixing the cable to the outlet box and/or junction box.

Although various prior art constructions have been developed for enabling flexible meal conduits and/or metal clad or armored cables to be mounted to outlet boxes and/or junction boxes with a right angle bend incorporated therewith, these prior art constructions have proven to be extremely difficult to employ due to the configuration and mounting requirements incorporated into these prior art connectors. In general, the prior art connectors incorporate two components, a base member which incorporates a right angular construction, and a cover member which is securable to the base member. Although these constructions function to enable the conduits and/or metal clad or armored cables to be secured in the desired manner, these prior art constructions suffer in and their complexity of use.

In this regard, these prior art connectors require the user to employ both hands to remove the cover, and then require the user to use both hands to secure the cover in the desired position. Since the installer must also hold the conduit and/or metal clad or armored cable in the desired position for affixation to the connector, use of the connector is extremely difficult and cumbersome. As a result, substantial difficulty is encountered and additional manpower is frequently required.

Therefore, it is a principal object of the present invention to provide a connector for use with flexible metal conduits and/or armored or metal clad cables which provides secure, rapid mounted engagement and retention of the conduit and/or cable and connector for mounting of the conduit/cable at right angles with any desired outlet box and/or a junction box.

Another object of the present invention is to provide a connector for use with flexible metal conduits and/or armored or metal clad cables, having the characteristic features described above, which is capable of being employed quickly and easily, securely mounting the flexible metal conduit and/or armored or metal clad cable directly with the connector without difficulty.

Another object to the present invention is to provide a connector for use with flexible metal conduits and/or armored or metal clad cables, having the characteristic features described above, which enables the cover or conduit cable holding portion of the connector to be mounted and securely affixed to the base portion of the connector by a single individual employing a single hand.

Another object of the president is to provide a connector for use with flexible metal conduits and/or armored or metal clad cables, having the characteristic features described above, which incorporates a cover or conduit cable holding portion which is pivotally mounted to the base portion for enabling ease-of-use and securement of the components to each other.

Other and more specific objects will in part be obvious and will in part appear hereinafter.

SUMMARY OF THE INVENTION

By employing the present invention, all of the difficulties and drawbacks of the prior art systems have been overcome, and an efficient, easily manufactured and easily assembled conduit/cable connector is realized. Furthermore, using the conduit/cable connector of the present invention, any desired flexible metal conduit and/or armored or metal clad cable is quickly and easily secured to the connector for mounting thereof to an outlet box or junction box at right angles, with complete assurance that the entire mounting operation can be achieved by a single operator both quickly and easily.

In its preferred construction, the conduit/cable connector of the present invention comprises two principal components, a base member and a clamping cover member. The base member is constructed with the desired right angular configuration integrated therein, with fastening means affixed thereto for enabling the base member to be quickly and easily securely mounted to any desired junction box or outlet box.

Typically, the fastening means incorporated as a part of the base member comprises a flange having a diameter greater than the diameter of the pre-formed aperture incorporated into the junction box or outlet box in combination with a threaded end and locknut or an aperture engaging locking device. Regardless of which securement system is employed, the cable/conduit connector of the present invention is quickly and easily affixed to any desired outlet box or junction box.

Once the cable/conduit connector of the present invention is mounted in the desired location to a desired junction box or outlet box, a flexible metal conduit and/or armored or metal clad cable is quickly and easily secured to the cable/conduit connector in order to enable the operator to install the desired electrical wires. Alternatively, the flexible metal conduit and/or armored or metal clad cable is first secured to the conduit/cable connector and, thereafter, the conduit/ cable connector, with the flexible metal conduit and/or armored or metal clad cable affixed thereto, are secured to the desired junction box or outlet box.

As discussed above, the prior art conduit/cable connectors require the use of two separate fastening screws and in order to secure the cover portion of the connector to the base portion. However, in order to obtain the desired secure mounting of the flexible metal conduit and/or armored or metal clad cable to the connector using this prior art construction, repeated attempts must be made by the user in securing the cover to the base member, due to the difficulty in obtaining the desired clamping pressure when two screws must be secured in an alternating manner.

In accordance with the present invention, the conduit/cable connector is constructed with a cover member which is pivotally mounted to the base member and is constructed for being secured to the base member using a single screw. As a result, the operator is able to quickly and easily insert the flexible metal conduit and/or armored or metal clad cable into the receiving zone of the connector and then secure the cover member in clamping engagement with the flexible metal conduit and/or armored or metal clad cable by employing a single fastening screw. In this way, the desired secure mounted engagement and affixation of any desired flexible metal conduit and/or armored or metal clad cable to a conduit/cable connector is achieved with ease and simplicity, by a single individual.

In the preferred embodiment of the present invention, the cover member is pivotally mounted to the base member employing two separate and independent securement elements. One element comprises a finger member which extends outwardly from substantially the midpoint of the cover member and is mounted in a receiving aperture formed in an upstanding side wall of the base member. By employing this construction, the cover member is capable of being easily raised and lowered relative to the base member, while being continuously engaged with the base member.

In addition, the second independent securement member formed in the conduit/cable connector of the present invention comprises a receiving slot formed in a flange which is mounted at the terminating end of the base member in combination with a locking arm and a locking tab formed on the cover member at its terminating end. By incorporating these components and lockingly engaging the arm and tab in the slot of the base member, the cover member is capable of being arcuately pivoted relative to the base member, while also being continuously secured and engaged with the base member, preventing its separation or removal therefrom. As a result of this construction, the desired flexible arcuate movement of the cover member relative to the base member is achieved, while also assuring secure mounted engagement and ease of assembly of the components whenever desired.

The invention accordingly comprises an article of manufacture possessing the features, properties, and the relation of elements which will be exemplified in the article hereinafter described, and the scope of the invention will be indicated in the claims.

THE DRAWINGS

For a fuller understanding of the nature and objects of the invention, reference should be had to the following detailed description taken in connection with the accompanying drawings, in which.

DETAILED DISCLOSURE

Figure 1:
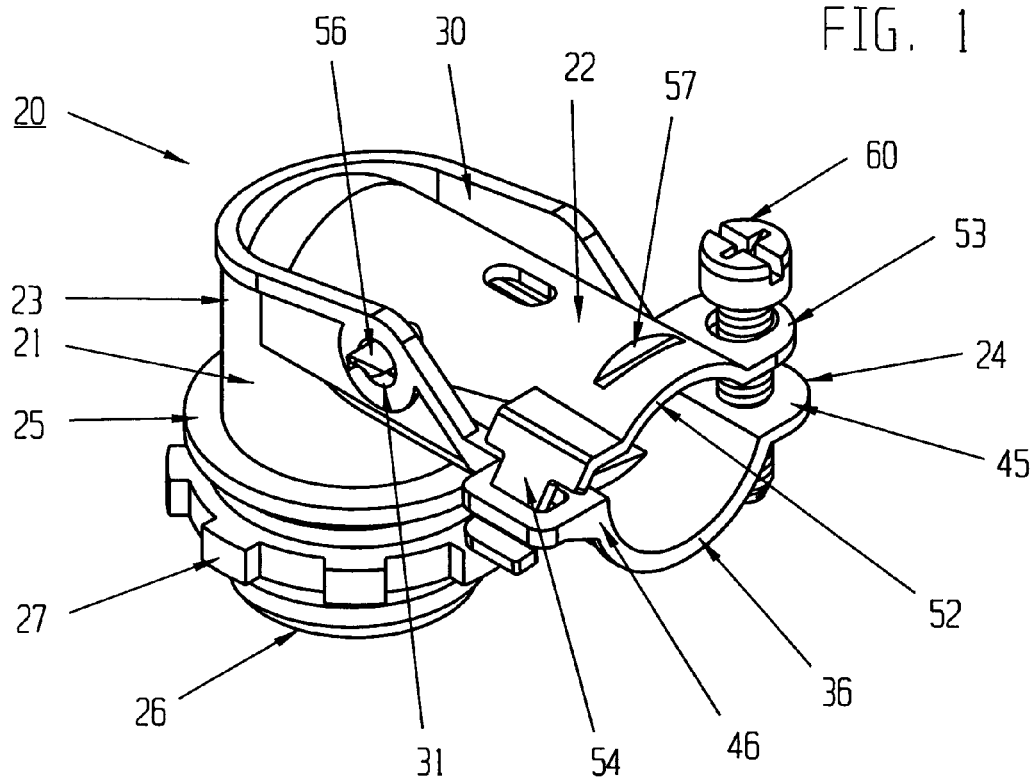
FIG. 1 is a perspective view of the conduit/cable connector of the present invention shown with one fastening member incorporated thereon.

By referring to FIGS. 1–6, along with the following detailed discussion, the construction and use of conduit/cable connector 20 of the present invention can best be understood. In this regard, although two alternate embodiments of the present invention are depicted and detailed herein, further alternate embodiments of the present invention can be implemented without departing from the scope of the present invention. Consequently, it is to be understood that FIGS. 1–6, and the following detailed discussion, are provided for exemplary purposes only and are not intended as a limitation of the present invention.

As shown in FIGS. 1–6, both alternate embodiments of conduit/cable connector 20 incorporate base member 21 and cover portion or member 22. In the preferred construction, base member 21 incorporates substantially cylindrically shaped front section 23 and support plate 24 radially extending from and interconnected with cylindrically shaped front section 23. Furthermore, in the preferred embodiment, cylindrically shaped front section 23 incorporates a radially extending flange 25 formed substantially midway along the length of cylindrically shaped front section 23 and a mounting portion 26 extending from flange 25 and forming the terminating end of front section 23.

In the embodiment depicted in FIG. 1, mounting portion 26 comprises a threaded zone extending from the terminating end of front section 23 to radially extending flange 25, with locknut 27 threadedly engaged therewith. In this way, whenever conduit/cable connector 20 is to be securely mounted to any desired outlet box or junction box, locknut 27 is removed from the threaded zone of mounting portion 26, while mounting portion 26 is inserted through the aperture formed in the outlet box or junction box to which conduit/cable connector 20 is to be secured. Once connector 20 is mounted in the desired position, locknut 27 is advanced into engagement with the threaded zone of mounting portion 26, thereby securely affixing conduit/cable connector 20 to the desired outlet box or junction box.

Figure 2:
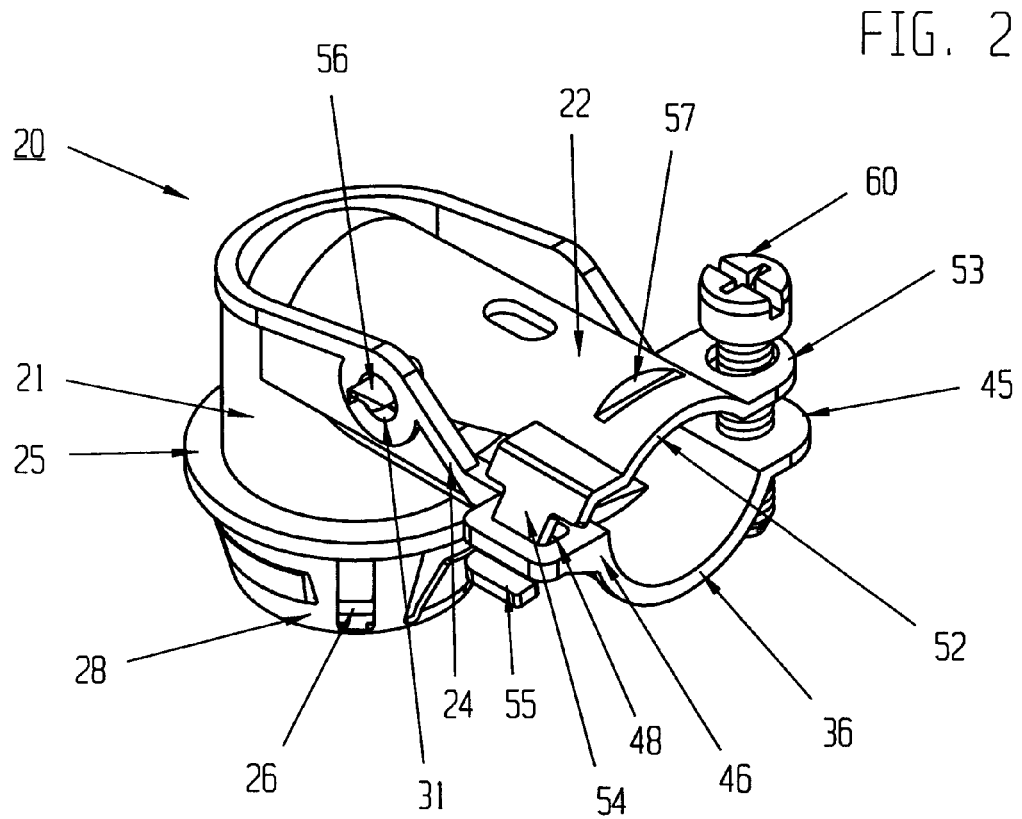
FIG. 2 is a perspective view of the conduit/cable connector of the present invention shown with an alternate fastening member incorporated thereon.

In the alternate embodiment, depicted in FIG. 2, mounting portion 26 is constructed for cooperative association and retention of locking collar 28. In this configuration, locking collar 28 is securely retained on mounting portion 26 and is constructed for being telescopically inserted through the aperture formed in the desired outlet box or junction box to which connector 20 is to be mounted. In addition, once locking collar 28 is advanced through the aperture, spring biased holding elements formed thereon expand outwardly, securely affixing locking collar 28 and connector 20 in the precisely desired position with the outlet box or junction box.

Regardless of which embodiment of the present invention is employed, the benefits detailed herein regarding conduit/ cable connector 20 are achieved. Furthermore, the detailed construction depicted in FIGS. 3–6, and fully detailed below, regarding base member 21 and cover portion 22 of conduit/cable connector 20 is equally applicable to both embodiments of the present invention shown in FIGS. 1 and 2. Consequently, although FIGS. 3–6 specifically depict the embodiment of FIG. 1, the overall construction and operation of conduit/cable connector 20 of the present invention, as well as the disclosure provided herein, is equally applicable to the embodiment of the present invention depicted in FIG. 2.

Figure 3:
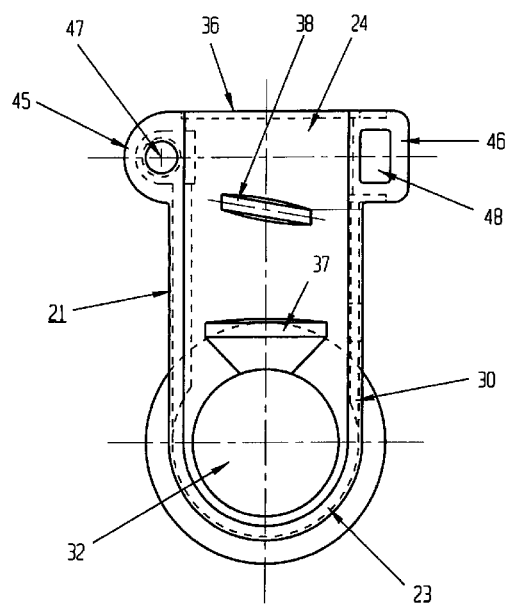
FIG. 3 is a top plan view of the base member forming the conduit/cable connector of the present invention.
Figure 4:
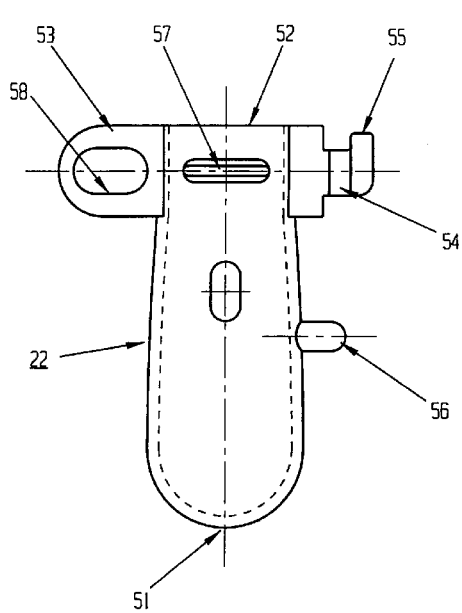
FIG. 4 is a top plan view of the cover member of the conduit/cable connector of the present invention.

In order to best understand the construction of conduit/cable connector 20 of the present invention, reference should be made to FIGS. 3 and 4, wherein the components forming conduit/cable connector 20 are depicted independently. In addition, by also referring to FIGS. 1–2 and 5–6, as well as the following detailed discussion, a complete understanding of the present invention can be readily attained.

As discussed above, base member 21 of conduit/cable connector 20 incorporates cylindrically shaped front section 23 and support plate 24 which is interconnected with and radially extends from front section 23. In addition, cylindrically shaped front section 23 peripherally surrounds and defines central passageway 32 which is constructed for enabling the wires extending through any desired flexible metal conduit and/or armored or metal clad cable 40 mounted to connector 20 to extend into the outlet box or junction box to which connector 20 is secured.

In addition, in the preferred construction, support plate 24 comprises a curved shape extending from cylindrically shaped front section 23 to its terminating end 36. The curved shape of support plate 24 is constructed for enabling any desired flexible metal conduit and/or armored or metal clad cable 40 to be positioned therein in secure, nested engagement.

Figure 5:
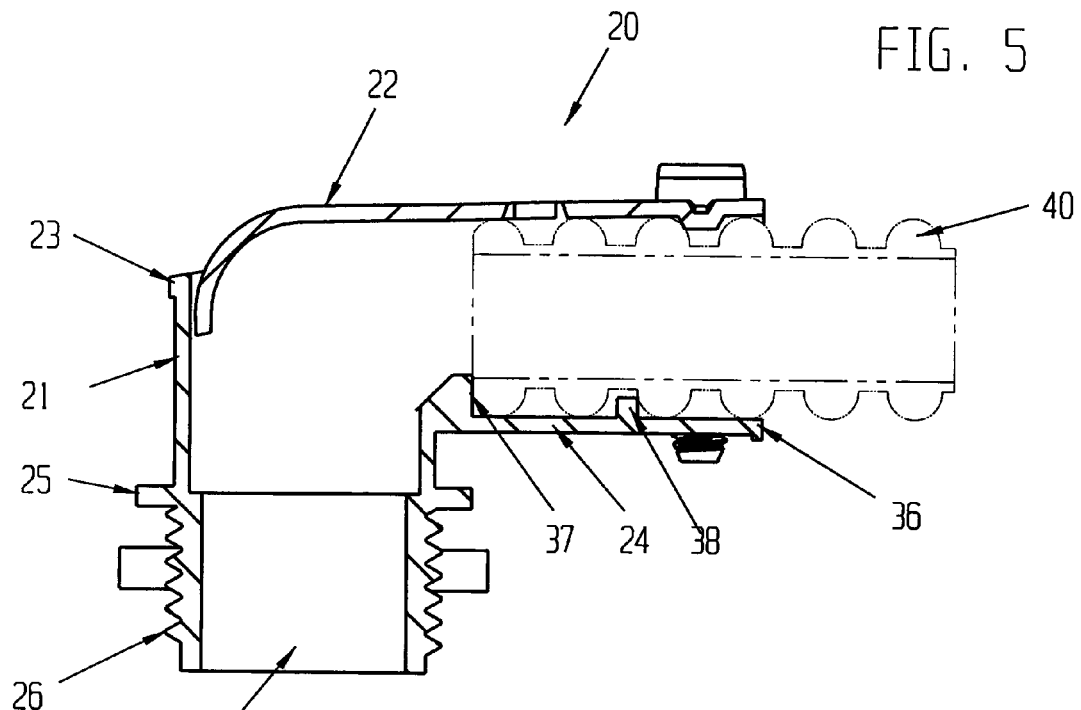
FIG. 5 is a cross-sectional, side elevation view of the fully assembled conduit/cable connector of the present invention detected with a flexible metal conduit securely mounted therewith.

In the preferred construction, as shown in FIGS. 3 and 5, support plate 24 incorporates an upstanding wall 37 formed on support plate 24 directly adjacent aperture 32. Upstanding wall 37 is preferably employed as an abutment stop for enabling the terminating end of flexible metal conduit and/or armored or metal clad cable 40 to be easily positioned on support plate 24 in the desired location.

Furthermore, support plate 24 also incorporates slanted flange 38, formed thereon between terminating end 36 and upstanding wall 37. Preferably, slanted flange 38 is positioned and constructed for cooperative engagement with the convolutions typically formed in the flexible metal conduit and/or armored or metal clad cable 40. In this way, flexible metal conduit and/or armored or metal clad cable 40 is quickly and easily positioned in direct captured association with support plate 24, while also being securely retained in the precisely desired location.

In addition, in the preferred construction, support plate 24 incorporates flanges 45 and 46 extending in opposite directions from the side edges thereof, directly adjacent terminating end 36. Furthermore, flange 45 incorporates a threaded, screw receiving aperture 47 formed therein, while elongated slot 48 is formed in flange 46.

In completing the construction of the preferred embodiment of base member 21 of conduit/cable connector 20, upper wall portion 30 is integrally formed thereon, peripherally surrounding aperture 32 and extending into mating, interconnected cooperating engagement with support plate 24. In addition, aperture 31 is formed in wall portion 30, substantially midway between central passageway 32 of cylindrically shaped front section 23 and terminating end 36 of support plate 24. As is more fully detailed below, aperture 31 is constructed for cooperatively engaging finger extension member 55 which is formed on cover portion 22, for enabling cover 22 and base member 21 to cooperate with each other for ease of assembly.

Figure 6:
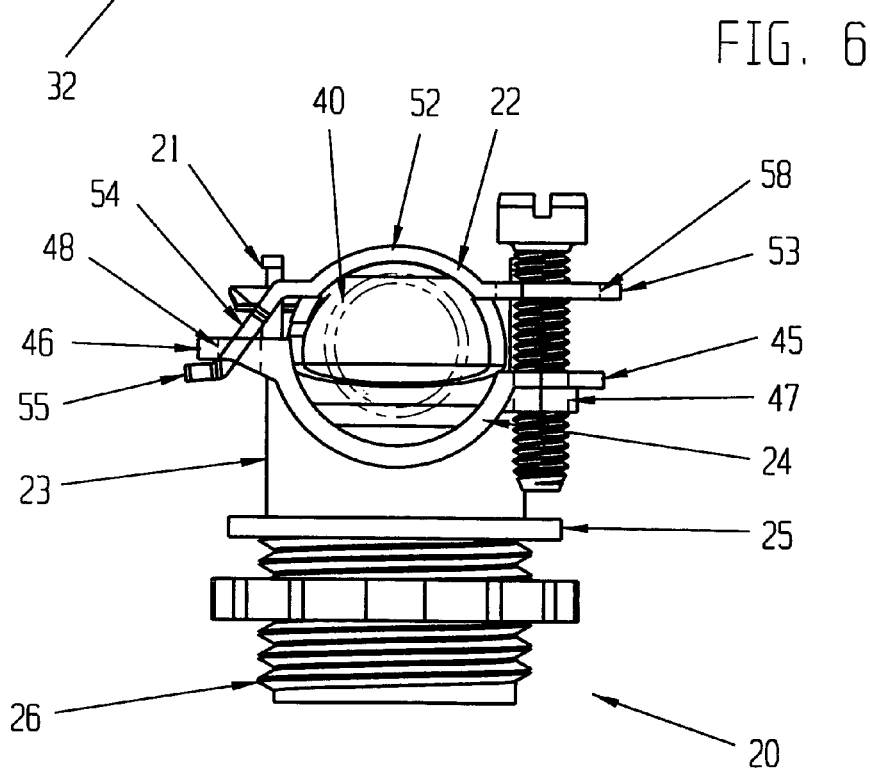
FIG. 6 is a front elevation view of the fully assembled conduit/cable connector of FIG. 5.

As best seen in FIGS. 4 and 6, cover member 22 of the present invention incorporates an elongated plate having an overall curved shape formed along the length thereof, and comprises a curved proximal end 51 constructed for cooperating, mating alignment with upstanding wall portion 30 of base member 21. In addition, cover member 22 incorporates a terminating distal end 52 with flange 53 extending from one side of cover portion 22 directly adjacent distal end 52 and arm member 54 extending from the oppose side of cover portion 22 directly adjacent distal end 52. In addition, arm member 54 incorporates an extension tab 55 formed at the end of arm member 54, which is employed, as more fully detailed below, for locking engagement in elongated slot 48 of flange 46 of base member 21. In addition, flange 53 incorporates an enlarged aperture 58.

Furthermore, cover member 22 incorporates finger member 56 extending from the side edge thereof substantially midway along the length of cover member 22, with finger member 56 being formed along the same side edge as arm member 54. As fully detailed below, by employing these components, cover member 22 is capable of mating, arcuate engagement with base member 21, enabling flexible metal conduit and/or armored or metal clad cable 40 to be easily inserted and lockingly engaged therewith, with ease and simplicity.

One final element preferably incorporated in cover member 22 is slanted flange 57 formed in cover member 22 directly adjacent terminating and 52. Although slanted flange 57 is not required, the incorporation of slanted flange 57 is preferred, since it is positioned for mating interengagement with the convolutions formed in flexible metal conduit and/or armored or metal clad cable 40, thereby assuring the secure positioning of flexible metal conduit and/or armored or metal clad cable 40 in the desired position.

In completing the construction of conduit/cable connector 20, screw member 60 is mounted through enlarged aperture 58 of flange 53 of cover member 22, with the threaded shank of screw member 60 being threadedly engaged in threaded aperture 47 of flange 45 of base member 21. In addition, in the preferred production of conduit/cable connector 20, cover member 22 is mounted to base member 21 by positioning finger member 56 through aperture 31, while also inserting arm member 54 and extension tab 55 through elongated slot 48 of flange 46. Finally, screw member 60 is advanced through enlarged aperture 58 and retained in threaded engagement in threaded aperture 47 of flange 45.

With cover member 22 mounted to base member 21 in this manner, cover member 22 is capable of being lifted or arcuately pivoted relative to base member 21, while still being securely retained thereto. In this regard, the incorporation of finger member 56 in aperture 31 as well as the locked engagement of arm member 54 and extension tab 55 in slot 48 provides cover member 22 with the flexibility to be pivoted or moved in an arcuate manner relative to base member 21, while also being non-removably secured thereto.

Furthermore, if additional movement of cover member 22 relative to base member 21 is required, finger member 56 of cover member 22 can be withdrawn from aperture 31, while arm member 54 and extension tab 55 remain in locked engagement within slot 48 of flange 46. As a result, cover member 22 is capable of being lifted or pivoted through an arc of almost 90° relative to base member 21, in order to provide access to support plate 24 and central passageway 32 of cylindrically shaped front section 23, when required. Then, once the desired positioning of any electrical wires and flexible metal conduit and/or armored or metal clad cable 40 has been completed, finger member 56 is inserted through aperture 31 and cover member 22 is pivoted back to its original position in overlying, contacting engagement with flexible metal conduit and/or armored or metal clad cable 40 mounted therewith.

By employing conduit/cable connector 20 of the present invention, as detailed above, any desired flexible metal conduit and/or armored or metal clad cable 40 is quickly and easily securely mounted to conduit/cable connector 20 by a single individual, with the flexible metal conduit and/or armored or metal clad cable 40 securely clamped between cover member 22 and base member 21. In this regard, cover member 22 is lifted or arcuately pivoted, as required, in order to enable flexible metal conduit and/or armored or metal clad cable 40 to be positioned on radially extending support plate 24 of base member 21. In order to assist in the positioning and engagement of flexible metal conduit and/or armored or metal clad cable 40 in the precisely desired location, the terminating end of flexible metal conduit and/or armored or metal clad cable 40 is placed in abutting contact with upstanding wall 37 formed on support plate 24. In addition, once in this position, slanted flange 38 is constructed for nested engagement with one of the convolutions formed along armored or metal clad cable 40.

With flexible metal conduit and/or armored or metal clad cable 40 positioned in the precisely desired location on support plate 24, cover member 22 is placed in overlying, contacting engagement with flexible metal conduit and/or armored or metal clad cable 40, effectively sandwiching and clamping flexible metal conduit and/or armored or metal clad cable 40 between cover member 22 and base member 21. Once this desired position has been attained, the operator merely rotates screw member 60 into further threaded engagement with threaded aperture 47 of flange 45 until the screw head contacts flange 53 of cover member 22, causing cover member 22 to be drawn into clamping engagement with base member 21. In this way, flexible metal conduit and/or armored or metal clad cable 40 is securely mounted in the precisely desired location with ease and simplicity by a single operator.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having describe my invention, what I claim as new and desire to secure by Letters Patent is:

1. A connector constructed for enabling a flexible metal conduit and/or armored or metal clad cable to be affixed thereto with the connector being secured to in an aperture or an outlet box, junction box, or other enclosure, said connector comprising:
   A. a base comprising
      a) a passageway defining member comprising a substantially cylindrical shape, cooperatively associated with a receiving member for enabling conducting wires extending through the flexible metal conduit and/or armored or metal clad cable to be passed therethrough, and incorporating an upstanding wall integrally formed as a portion of the cylindrical shape, peripherally surrounding a major portion of the passageway, with said wall incorporating a finger receiving hole formed therein;
      b) a conduit/cable receiving member extending from the cylindrically shaped section at substantially right angles thereto,
      c) an arm receiving slot formed on the terminating end of the conduit/cable receiving member along a first side edge thereof, and
      d) a threaded aperture formed on the terminating end of the conduit/cable receiving member along a second side edge thereof, said second side edge being opposite the first side edge;
   B. a cover comprising an elongated plate constructed for cooperating with the base for covering the passageway and for being in overlying engagement with the connector/cable mounted on the connector cable receiving member, said elongated plate comprising
      a) an arm portion extending from a first side edge in position for engagement in the slot of the conduit/cable receiving member, and incorporating a tab formed at the terminating end of the arm portion, constructed for locking engagement with the slot of the base, effectively preventing easy removal of the cover from the base, and
      b) a flange extending from a second side edge, said second side edge being opposite the first side edge, and said flange incorporating an aperture formed therein for cooperative aligned relationship with the threaded aperture of the base; and
   C. an elongated fastener comprising a threaded shank and a head portion mounted at one terminating end of the shank, said fastener constructed for being positioned through the aperture of the flange and being a threadedly engaged in the threaded aperture of the base, for enabling rotation of the fastener in one direction to advance the head into holding engagement with the flange of the cover, thereby clamping a conduit/cable between the cover and the base.

2. The conduit/cable connector defined in claim 1, wherein said cover is further defined as incorporating a finger member formed along one side edge thereof, positioned for engaging with the finger receiving hole of the base.

3. The conduit/cable connector defined in claim 2, wherein said finger member and said finger receiving hole are both formed along the side of the connector incorporating the arm member and the arm receiving slot, thereby enabling the cover and base to be cooperatively associated with each other for enabling the cover to arcuately pivot relative to the base, while being incapable of easy disassembly from each other.

4. The conduit/cable connector defined in claim 1, wherein said conduit/cable receiving member incorporates an upstanding abutment wall formed thereon, positioned for cooperatively receiving and positioning the terminating end of the flexible metal conduit and/or armored or metal clad cable placed on said receiving member.

5. The conduit/cable connector defined in claim 4, wherein said conduit/cable receiving member further incorporates an upstanding, slanted ledge formed thereon for engaging in the open zones formed between convolutions of the flexible metal conduit and/or armored or metal clad cable.

6. The conduit/cable connector defined in claim 5, wherein said cover is further defined as incorporating a slanted ledge extending from an interior surface thereof for cooperative engagement with the open zones formed between convolutions of the flexible metal conduit and/or armored or metal clad cable.

7. The conduit/cable connector defined in claim 1, when said base is further defined as comprising a flange formed about the cylindrically shaped section and radially extending outwardly therefrom and defining a mounting zone between the flange and the terminating end of the cylindrically shaped section.

8. The conduit/cable connector defined in claim 7, wherein said base further comprises threads formed on the terminating end of the cylindrically shaped section constructed for cooperating with is a locknut for securing the connector in the aperture of the outlet box, junction box, or other enclosure.

9. The conduit/cable connector defined in claim 7, wherein said base further comprises a locking device receiving zone formed on the terminating end of the cylindrically shaped section, constructed for cooperating with a locking device for enabling secure mounted engagement of the connector in the aperture of the outlet box, junction box, or other enclosure.

10. A connector constructed for enabling a flexible conduit and/or armored or metal clad cable to be affixed thereto with the connector being secured to in an aperture or an outlet box, junction box, or other enclosure, said connector comprising:

A. a base comprising
   a) a passageway defining member comprising a substantially cylindrical shape, and constructed for enabling conducting wires extending through the flexible metal conduit and/or armored or metal clad cable to be passed therethrough, and incorporating an upstanding wall integrally formed as a portion of the cylindrical shape, peripherally surrounding a major portion of the passageway, with said wall incorporating a finger receiving hole formed therein,
   b) a conduit/cable receiving member cooperatively associated with the passageway defining member and extending therefrom at a substantially right angle thereto,
   c) an arm receiving slot formed adjacent the terminating end of the conduit/cable receiving member along a first side edge thereof,
   d) a threaded aperture formed adjacent the terminating end of the conduit/cable receiving member along a second side edge thereof, said second side edge being opposite the first side edge;

B. a cover comprising an elongated plate constructed for cooperating with the base for covering the passageway and for being in overlying engagement with the connector/cable mounted on the connector/cable receiving member, said elongated plate comprising
   a) an arm portion formed adjacent one terminating end and extending from a first side edge in position for engagement in the slot of the conduit/cable receiving member, and incorporating a tab formed at the terminating end of the arm portion, constructed for locking engagement with the slot of the base, effectively preventing easy removal of the cover from the base,
   b) a flange formed adjacent one terminating end and extending from a second side edge, said second side edge being opposite the first side edge, and said flange incorporating an aperture formed therein for cooperative aligned relationship with the threaded aperture of the base; and C. an elongated fastener comprising a threaded shank and a head portion mounted at one terminating end of the shank, said fastener constructed for being positioned through the aperture of the flange and being threadedly engaged in the threaded aperture of the base, for enabling rotation of the fastener in one direction to advance the head into holding engagement with the flange of the cover, thereby clamping a conduit/cable between the cover and the base.

11. The conduit/cable connector defined in claim 10, wherein said cover is further defined as incorporating a finger member formed along one side edge thereof, positioned for engaging with the finger receiving hole of the base.

12. The conduit/cable connector defined in claim 11, wherein said finger member and said finger receiving hole are both formed along the side of the connector incorporating the arm member and the arm receiving slot, thereby enabling the cover and base to be cooperatively associated with each other for enabling the cover to arcuately pivot relative to the base, while being incapable of easy disassembly from each other.

* * * * *